(12) United States Patent
Sun et al.

(10) Patent No.: US 8,670,955 B2
(45) Date of Patent: Mar. 11, 2014

(54) SYSTEMS AND METHODS FOR RELIABILITY ASSISTED NOISE PREDICTIVE FILTERING

(75) Inventors: Lingyan Sun, Longmont, CO (US);
Hongwei Song, Longmont, CO (US);
Jingfeng Liu, Longmont, CO (US)

(73) Assignee: LSI Corporation, San Jose, CA (US)

( * ) Notice: Subject to any disclaimer, the term of this patent is extended or adjusted under 35 U.S.C. 154(b) by 375 days.

(21) Appl. No.: 13/088,178

(22) Filed: Apr. 15, 2011

(65) Prior Publication Data

US 2012/0265488 A1    Oct. 18, 2012

(51) Int. Cl.
*G06F 19/00* (2011.01)
*G11B 5/09* (2006.01)

(52) U.S. Cl.
USPC ............................................. 702/181; 360/32

(58) Field of Classification Search
USPC .......................................................... 702/181
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Bryan Bui
(74) *Attorney, Agent, or Firm* — Hamilton DeSanctis & Cha

(57) ABSTRACT

Various embodiments of the present invention provide systems and methods for data processing. As an example, a data processing circuit is disclosed that includes: a data detector circuit, a calibration circuit, and an enable circuit. The data detector circuit is operable to apply a data detection algorithm to a data input to yield a detected output based at least in part on control values. The calibration circuit operable to update the control values based at least in part on the data input, the detected output, and a calibration circuit enable. The calibration circuit enable is generated by the enable circuit based at least in part on the detected output.

20 Claims, 5 Drawing Sheets

(56) References Cited

U.S. PATENT DOCUMENTS

| | | |
|---|---|---|
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman et al. |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,136,244 B1 | 11/2006 | Rothberg |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,509,927 B2 | 9/2009 | Shin et al. |
| 7,587,657 B2 | 9/2009 | Haratsch |
| 7,590,168 B2 | 9/2009 | Raghavan et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong et al. |
| 7,801,200 B2 | 9/2010 | Tan |
| 7,802,163 B2 | 9/2010 | Tan |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0112896 A1 | 6/2003 | Raghavan et al. |
| 2003/0134607 A1 | 7/2003 | Raghavan et al. |
| 2004/0037202 A1* | 2/2004 | Brommer et al. ............... 369/94 |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung et al. |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047121 A1 | 3/2007 | Eleftheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam |
| 2008/0301521 A1 | 12/2008 | Gunnam |
| 2009/0185643 A1 | 7/2009 | Fitzpatrick |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghavan et al. |
| 2010/0042877 A1 | 2/2010 | Tan |
| 2010/0042890 A1 | 2/2010 | Gunnam |
| 2010/0050043 A1 | 2/2010 | Savin |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |
| 2011/0075569 A1 | 3/2011 | Marrow et al. |
| 2011/0080211 A1 | 4/2011 | Yang et al. |
| 2011/0167246 A1 | 7/2011 | Yang et al. |
| 2012/0212849 A1* | 8/2012 | Xu et al. ............... 360/32 |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.
U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.

(56) References Cited

OTHER PUBLICATIONS

U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center NY, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Unknown, "Auto threshold and Auto Local Threshold" [online] [retrieved May 28, 2010] Retrieved from the Internet: <URL:http://www.dentristy.bham.ac.uk/landinig/software/autoth.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-55, IEEE trans. Magnetics, vol. 37, No. 2.
Youn, et al. "BER Perform. Due to Irrreg. of Row-Weight Distrib. of the Parity-Chk. Matrix in Irreg. LDPC Codes for 10-Gb/s Opt. Signls" Jrnl of Lightwave Tech., vol. 23, Sep. 2005, 8 pages.
Zhong et al., "Area-Efficient Min-Sum Decoder VLSI Architecture for High-Rate QC-LDPC Codes in Magnetic Recording" Submitted 2006, not yet published, 6 pages.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "VLSI Architecture of LDPC Based Signal Detection and Coding System for Magnetic Recording Channel", Thesis, RPI, Troy, NY, pp. 1-95, May 2006.

* cited by examiner

SYSTEMS AND METHODS FOR RELIABILITY ASSISTED NOISE PREDICTIVE FILTERING

BACKGROUND OF THE INVENTION

The present inventions are related to systems and methods for data processing.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by noise arising in the data transfer. To deal with such noise, some data processing systems utilize a noise predictive filter. However, existing noise predictive filters are not sufficient for dealing with various noise conditions.

Hence, for at least the aforementioned reasons, there exists a need in the art for advanced systems and methods for data processing.

BRIEF SUMMARY OF THE INVENTION

The present inventions are related to systems and methods for data processing.

Various embodiments of the present invention provide data processing circuits that include: a data detector circuit, a calibration circuit, and an enable circuit. The data detector circuit is operable to apply a data detection algorithm to a data input to yield a detected output based at least in part on control values. The calibration circuit operable to update the control values based at least in part on the data input, the detected output, and a calibration circuit enable. The calibration circuit enable is generated by the enable circuit based at least in part on the detected output. In some cases, the data detector circuit is a Viterbi algorithm detector circuit. In other cases, the data detector circuit is a maximum a posteriori algorithm detector circuit.

In some instances of the aforementioned embodiments, the calibration circuit enable is asserted to enable operation of the calibration circuit when the detected output indicates a reliable instance of the detected output. In other instances of the aforementioned embodiments, the calibration circuit enable is asserted to disable operation of the calibration circuit when the detected output indicates an unreliable instance of data. In yet other instances of the aforementioned embodiments, the calibration circuit enable is asserted to disable operation of the calibration circuit when a defined number of consecutive instances of the detected output indicate unreliable data. In some such instances, the defined number is four.

In various instances of the aforementioned embodiments, the enable circuit is further operable to: calculate a mean of a number of instances of the detected output to yield a mean output, scale the mean output to yield a scaled mean output, determine that an absolute value of the current instance of the detected output is greater than the scaled mean output, and assert the calibration circuit enable to enable operation of the calibration circuit based on the determination that the absolute value of the current instance of the detected output is greater than the scaled mean output. In other instances of the aforementioned embodiments, the enable circuit is further operable to: calculate a mean of a number of instances of the detected output to yield a mean output, scale the mean output to yield a scaled mean output, determine that an absolute value of a defined number of consecutive instances of the detected output are less than the scaled mean output, and assert the calibration circuit enable to disable operation of the calibration circuit based on the determination that the absolute value of a defined number of consecutive instances of the detected output are less than the scaled mean output.

Other embodiments of the invention provide methods for data processing. Such methods include: receiving a data input; performing a data detection on the data input to yield a detected output based at least in part on control values; filtering the data input using the detected output to yield the control values; determining that the detected output indicates reliable data bits; and enabling update of the control values based at least in part on the determination that the detected output indicates reliable data bits. In some cases, the methods further include: determining that the detected output indicates unreliable data bits; and disabling update of the control values based at least in part on the determination that the detected output indicates unreliable data bits. In other cases, the methods further include: determining that a defined number of consecutive instances of the detected output indicates unreliable data bits; and disabling update of the control values based at least in part on the determination that the defined number of consecutive instances of the detected output indicates unreliable data bits. In some such cases, the defined number is four.

Yet other embodiments of the present invention provide storage systems that include: a storage medium, a read/write head assembly operable to sense information from the storage medium and to provide a corresponding continuous signal, an analog front end circuit operable to process the continuous signal to yield an analog input, an analog to digital converter circuit operable to sample the analog input synchronous to a sampling clock to yield a set of digital samples, an equalizer circuit operable to equalize the set of digital samples and to provide a corresponding equalized output, a data detector circuit operable to apply a data detection algorithm to the equalized output to yield a detected output based at least in part on control values, a calibration circuit operable to update the control values based at least in part on the data input, the detected output, and a calibration circuit enable, and an enable circuit operable to generate the calibration circuit enable based at least in part on the detected output.

In some instances of the aforementioned embodiments, the calibration circuit enable is asserted to enable operation of the calibration circuit when the detected output indicates a reliable instance of the detected output. In other instances of the aforementioned embodiments, the calibration circuit enable is asserted to disable operation of the calibration circuit when the detected output indicates an unreliable instance of data. In yet other instances of the aforementioned embodiments, the calibration circuit enable is asserted to disable operation of the calibration circuit when a defined number of consecutive instances of the detected output indicate unreliable data. In some such instances, the defined number is four.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing.

Various embodiments of the present invention provide data processing circuits that include a reliability enhanced noise predictive filter circuit. In some cases, the reliability enhanced noise predictive filter circuit includes an enable circuit that disables updating of the noise predictive filter when soft data received from a data detector circuit indicates that particular bit periods are not reliable, and re-enables updating of the noise predictive filter when the soft data indicates that other bit periods are reliable. Using such reliability based noise predictive filtering, a noise predictive calibration process in a data processing circuit can be improved.

Figure 1:
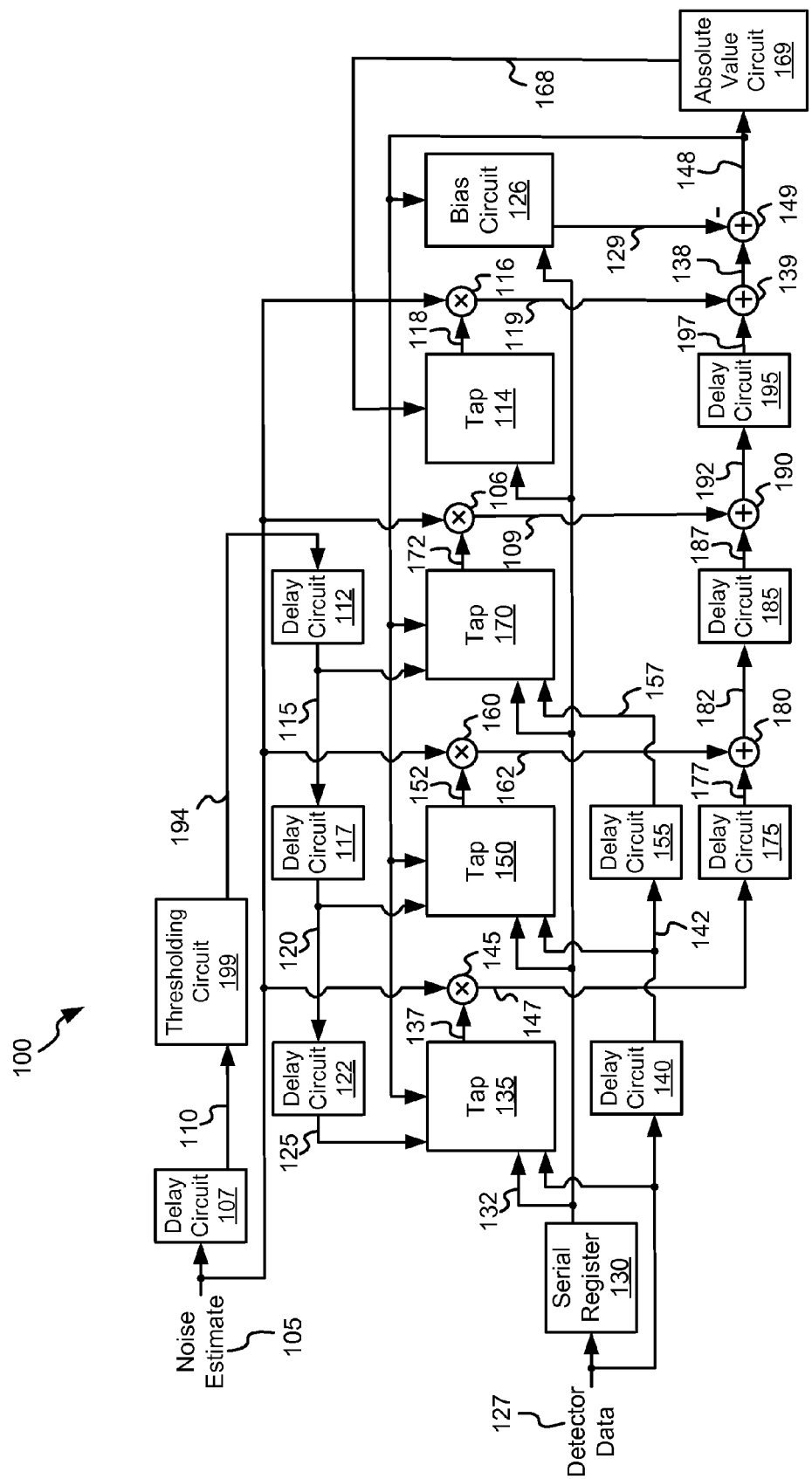
FIG. 1 shows a noise predictive calibration circuit that may be used in relation to embodiments of the present invention.

Turning to FIG. 1, a noise predictive calibration circuit 100 is shown that may be used in relation to various embodiments of the present invention. Noise predictive calibration circuit 100 includes a noise estimate input 105 that is provided to a delay circuit 107 that provides a corresponding delayed output 110. In some embodiments of the present invention, noise estimate input 105 is an equalized output from an upstream equalizer circuit (not shown). Delay circuit 107 applies a delay sufficient to align noise estimate input 105 with a register output 132 (i.e., to align noise estimate input 105 with detector data 127. Delayed output 110 is provided to a thresholding circuit 199 that compares delayed output 110 against a threshold value. Where delayed output 110 exceeds the threshold value, thresholding circuit 199 asserts a hard output 194 as a logic '1', otherwise, thresholding circuit 199 asserts a hard output 194 as a logic '0'.

Hard output 194 is provided to a delay circuit 112 that provides a delayed version of hard output 194 as a delayed output 115. Delayed output 115 is provided to a delay circuit 117 that provides a delayed version of delayed output 115 as a delayed output 120. Delayed output 120 is provided to a delay circuit 122 that provides a delayed version of delayed output 125 as a delayed output 125. Delayed output 115 is provided to a tap circuit 170, delayed output 120 is provided to a tap circuit 150, and delayed output 125 is provided to a tap circuit 135. In addition, an error output 148 is provided to tap circuit 135, tap circuit 150, tap circuit 170, a tap circuit 114, and a bias circuit 126.

A serial register 130 receives detector output 127 and serially stores three consecutive bits of detector data 127. The three bits are provided as register output 132 to each of tap circuit 135, tap circuit 150, tap circuit 170, tap circuit 114 and tap circuit 126. On each clock cycle the next bit of detector data 127 is clocked into serial register 130 in alignment with noise estimate input 105 being applied to tap circuit 135, tap circuit 150 and tap circuit 170. In addition, detector data 127 is provided to tap circuit 135 and to a delay circuit 140. Delay circuit 140 provides a delayed version of detector data 127 as a delayed output 142. Delayed output 142 is provided to tap circuit 150 and to a delay circuit 155. Delay circuit 155 provides a delayed version of delayed output 142 as a delayed output 157. Delayed output 157 is provided to tap circuit 170.

Noise estimate input 105 is provided to a multiplier circuit 145, a multiplier circuit 160, a multiplier circuit 106, and a multiplier circuit 116. Multiplier circuit 145 multiplies noise estimate input 105 by a tap value 137 to yield a product 147. Multiplier circuit 160 multiplies noise estimate input 105 by a tap value 152 to yield a product 162. Multiplier circuit 170 multiplies noise estimate input 105 by a tap value 172 to yield a product 109. Multiplier circuit 114 multiplies noise estimate input 105 by a tap value 118 to yield a product 119. Product 147 is provided to a delay circuit 175 that yields a corresponding delayed output 177. Delayed output 177 is provided to an adder circuit 180 that sums delayed output 177 and product 162 to yield a sum 182. Sum 182 is provided to a delay circuit 185 that yields a corresponding delayed output 187. Delayed output 187 is provided to an adder circuit 190 that sums delayed output 187 and product 109 to yield a sum 192. Sum 182 is provided to a delay circuit 195 that yields a corresponding delayed output 197. Delayed output 197 is provided to an adder circuit 139 that sums delayed output 197 and product 119 to yield a sum 138.

Bias circuit 126 calculates a bias value 129 based upon register output 132 and error output 148. Bias value 129 is provided to an adder circuit 149 where it is subtracted from sum 138 to yield error value 148. Error value 148 is provided to an absolute value circuit 169 that provides the absolute value of error value 148 as absolute error value 168. Absolute error value 168 is provided as a correction value to tap circuit 114. Tap circuits 135, 150, 170, 114 and bias circuit 126 may be implemented using any such circuits known in the art. Tap values 137, 152, 172, 118 are provided to a data detector circuit (not shown).

Figure 2:
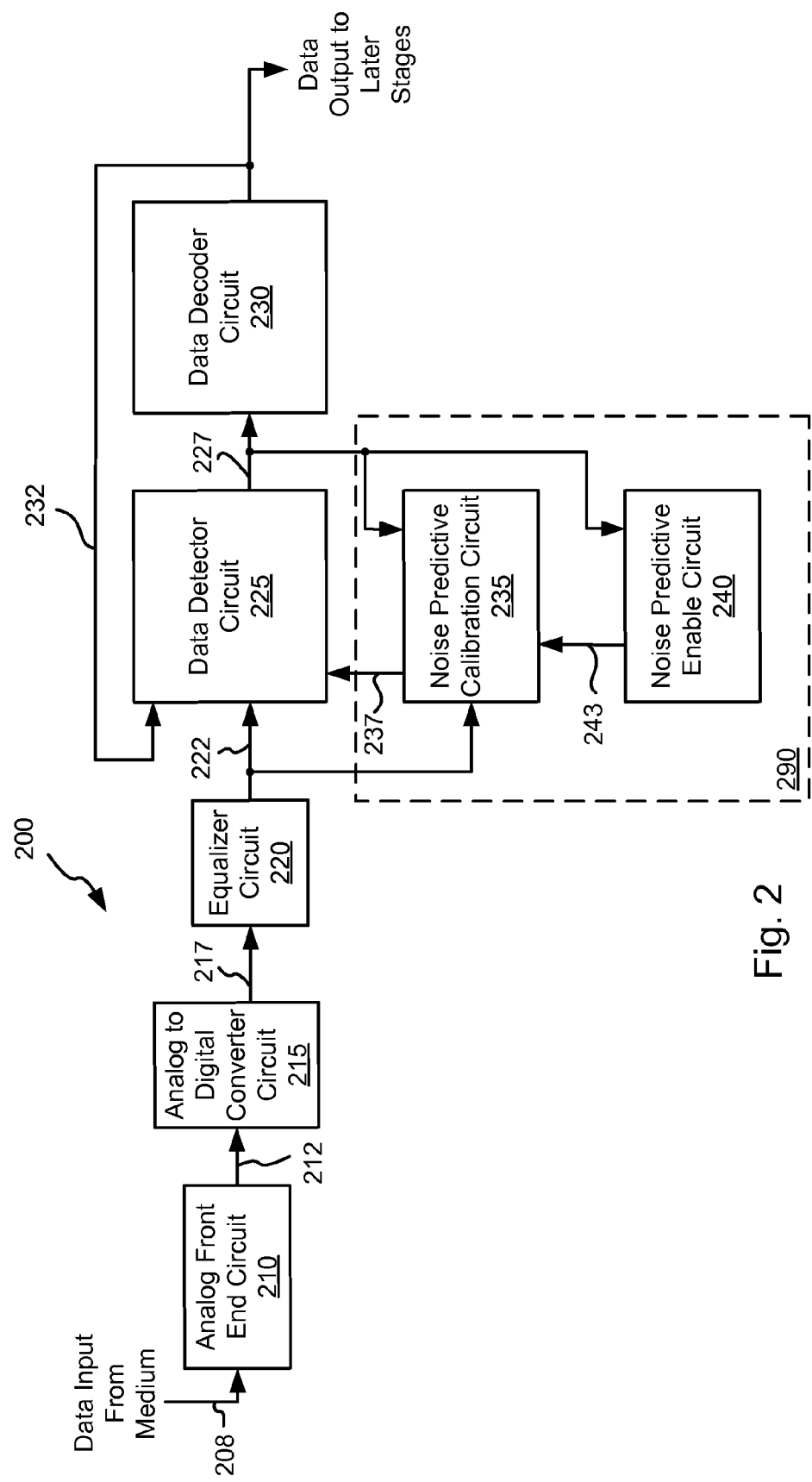
FIG. 2 shows a data processing circuit including a a reliability enhanced noise predictive filter circuit in accordance with various embodiments of the present invention.

Turning to FIG. 2, shows a data processing circuit 200 includes a reliability enhanced noise predictive filter circuit 290 is shown in accordance with various embodiments of the present invention. Data processing circuit 200 includes an analog front end circuit 210 that receives a data input 208 a medium (not shown). The medium may be, for example, a storage medium, a wireless transmission medium, or a wired transmission medium. Based upon the disclosure provided herein, one of ordinary skill in the art will recognize a variety of media from which data input 208 can be derived in accordance with different embodiments of the present invention. Analog front end circuit 210 processes data input 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 217 are provided to an equalizer circuit 220. Equalizer circuit 220 applies an equalization algorithm to digital samples 217 to yield an equalized output 222. In some embodiments of the present invention, equalizer circuit 220 is a digital finite impulse response filter circuit as are known in the art.

Equalized output 222 is provided to a data detector circuit 225 that performs a data detection algorithm on equalized output 222 as aided by a decoder output 234. The operation of data detector circuit 225 is governed by taps 237 from reliability enhanced noise predictive filter circuit 290. In some embodiments of the present invention, data detector circuit 225 is a Viterbi algorithm data detector circuit. In other embodiments of the present invention, data detector circuit 225 is a maximum a posteriori data detector circuit. Based upon the disclosure provided herein, one of ordinary skill in the art will recognize a variety of data detector circuits that may be utilized in accordance with different embodiments of the present invention. Data detector circuit 225 provides the result of the detection algorithm as a detected output 227. Detected output 227 indicates a likelihood that a corresponding detected bit is correct. A higher value of detected output 227 indicates a higher likelihood that the corresponding detected bit is correct, and a lower value of detected output 227 indicates a lower likelihood that the corresponding detected bit is correct.

Detected output 227 is provided to reliability enhanced noise predictive filter circuit 290 and to a data decoder circuit 230. Data decoder circuit 230 applies a decoding algorithm to detected output 227 to yield a decoder output 232 to later stages (not shown). In some embodiments of the present invention, data decoder circuit 230 is a low density parity check decoder circuit. Based upon the disclosure provided herein, one of ordinary skill in the art will recognize a variety of data decoder circuits that may be used in relation to different embodiments of the present invention.

Reliability enhanced noise predictive filter circuit 290 includes a noise predictive filter circuit 235 and a noise predictive enable circuit 240. Noise predictive filter circuit 235 may be implemented similar to noise predictive calibration circuit 100 discussed above in relation to FIG. 1. Where noise predictive filter circuit 235 is the same as noise predictive calibration circuit 100, detector output 127 corresponds to detected output 227, noise estimate input 105 corresponds to equalized output 222, and tap values 137, 152, 172, 118 correspond to taps 237. In operation, noise predictive calibration circuit 235 operates to generate taps 237 based upon a combination of equalizer output 222 and detected output 227. Of note, noise predictive filter circuit 235 is not limited to the noise predictive filter of FIG. 1, but may be implemented using any circuit known in the art that is capable of providing tap values to a data detector circuit based on one or both of equalized output 222 and detected output 227. Based upon the disclosure provided herein, one of ordinary skill in the art will recognize a variety of noise predictive filter circuits and architectures that may be used in relation to different embodiments of the present invention.

In addition, reliability enhanced noise predictive filter circuit 290 includes a noise predictive enable circuit 240. Noise predictive enable circuit 240 receives detected output 227, and based thereon asserts and de-asserts an enable signal 243. Enable signal 243 controls the updating of taps 237 by noise predictive calibration circuit 235. In particular, enable signal 243 is asserted such that taps 237 are updated when detected output 227 indicates a reasonable likelihood that the currently received data is correctly detected. In contrast, enable signal 243 is asserted such that taps 237 are not updated when detected output 227 indicates a that the currently received data is unlikely to have been correctly detected. Thus, reliability enhanced noise predictive filter circuit 290 modifies tap values (i.e., changes whether the tap values) provided to data detector circuit 225 based upon soft data received from data detector circuit 225. In particular, where the soft data received from data detector circuit 225 indicates that particular bit periods are not reliable, updates of taps 237 is disabled. Otherwise, where the soft data received from data detector circuit 225 indicates that particular bit periods are reliable, updates of taps 237 is enabled. Using such reliability based noise predictive filtering, a noise predictive calibration process can be improved.

Enable signal 243 may applied to noise predictive calibration circuit 235 in a number of ways. For example, de-assertion of enable signal 243 may disable a clock provided to noise predictive calibration circuit 235 effectively stopping all operation thereof. As another example, de-assertion of enable signal 243 may simply stop an update of taps 237 to data detector circuit 225, while allowing the underlying tap values to be changed. Based upon the disclosure provided herein, one of ordinary skill in the art will recognize a variety of mechanisms and/or approaches for disabling noise predictive calibration circuit 235 using enable signal 243 in accordance with various embodiments of the present invention.

Figure 3:
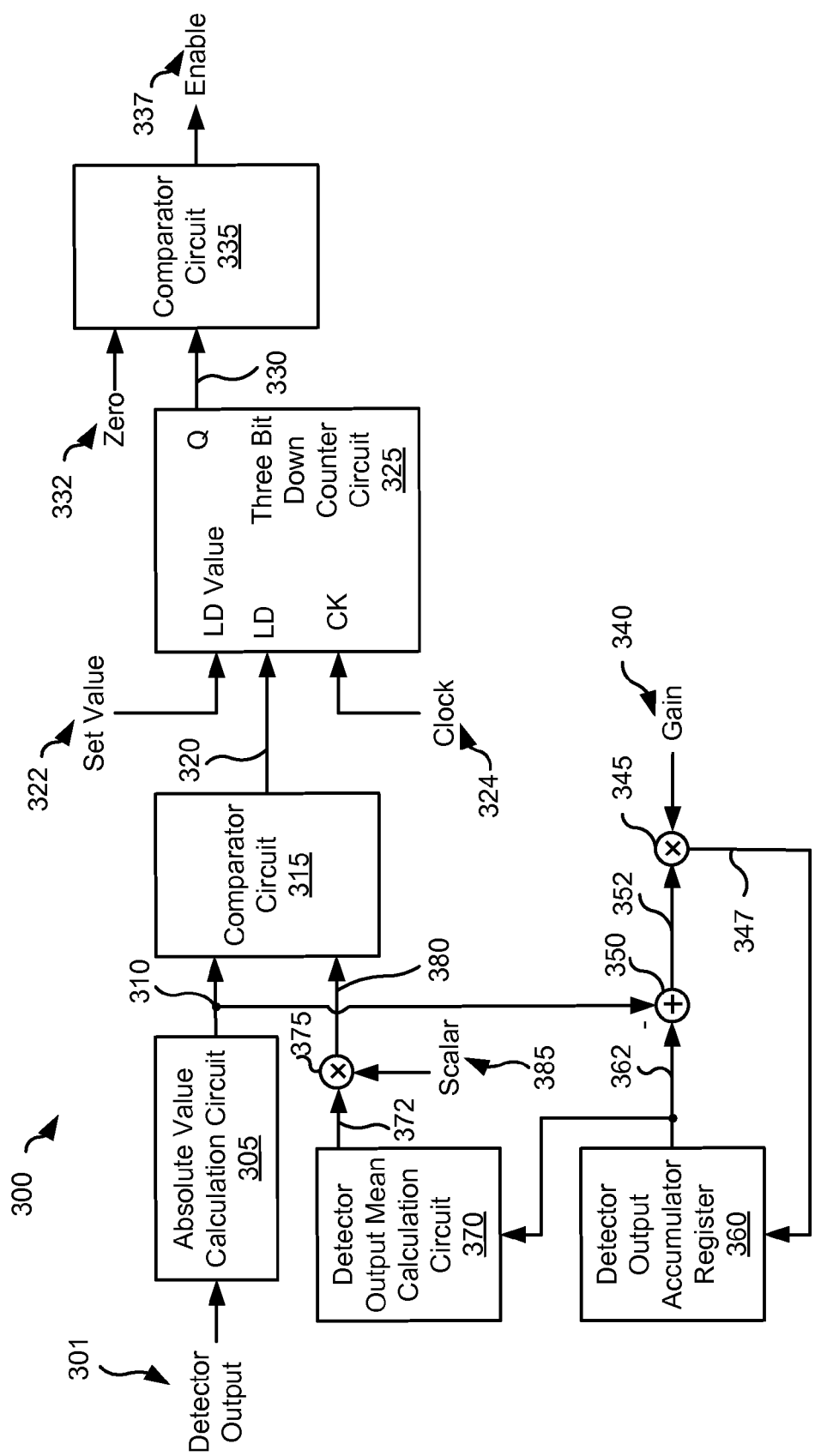
FIG. 3 is a detailed block diagram of a noise predictive enable circuit in accordance with various embodiments of the present invention.

Turning to FIG. 3, a detailed block diagram of a noise predictive enable circuit 300 is shown in accordance with various embodiments of the present invention. Noise predictive enable circuit 300 may be used in place of noise predictive enable circuit 240 discussed above in relation to FIG. 2. It should be noted that other implementations of the noise predictive enable circuit may be used in relation to different embodiments of the present invention.

Noise predictive enable circuit 300 includes an absolute value calculation circuit 305 that receives a detector output 301. Detector output 301 indicates a likelihood that a corresponding detected bit is correct. A higher value of detector output 301 indicates a higher likelihood that the corresponding detected bit is correct, and a lower value of detector output 301 indicates a lower likelihood that the corresponding detected bit is correct. Absolute value calculation circuit 305 calculates the absolute value of detector output 301 and provides it as an absolute value output 310. Absolute value output 310 is provided to an adder circuit 350 that subtracts it from an accumulated output 362 to yield a sum 352. Sum 352 is provided to a multiplier circuit 345 where it is multiplied by a gain 340 to yield a product 347. In some cases, gain 340 is programmable. Product 347 is stored to a detector output accumulator register 360. Detector output accumulator register 360 provides accumulated output 362 to adder circuit 350 and to a detector output mean calculation circuit 370. Detector output mean calculation circuit 370 divides accumulated output 362 by the number of samples to yield a mean value 372. Mean value 372 is provided to a multiplier circuit 375 that multiplies mean value 372 by a scalar value 385 to yield a scaled mean value 380. In some embodiments of the present invention, scalar value 385 is programmable. In particular instances of the aforementioned embodiments, scalar value 385 is user selectable between values of ¼, ⅛, 1/16 or zero.

Absolute value output 310 is also provided to a comparator circuit 315 that compares it with scaled mean value 380. Where absolute value output 310 is greater than scaled mean value 380 indicating that the most recently received detector output 301 corresponds to a detected data bit with a high likelihood of being correct, comparator circuit 315 asserts a comparator output 320 as a logic '1'. Otherwise, comparator circuit 315 asserts a comparator output 320 as a logic '0'. When comparator output 320 is asserted as a logic '1' a set value 322 is loaded into a three bit down counter circuit 325 on the next selected edge of a clock 324. Otherwise, three bit down counter circuit 325 is decremented on the next selected edge of clock 324. In some embodiments of the present invention, set value 322 is four (4). Based upon the disclosure provided herein, one of ordinary skill in the art will recognize other values of set value 322 that may be used in relation to different embodiments of the present invention.

A count value 330 from three bit counter circuit 325 is provided to a comparator circuit 335. Comparator circuit 335 compares count value 330 with a value 332 of zero. Where count value 330 equals zero, comparator circuit 335 de-asserts an enable signal 337. When enable signal 337 is de-asserted, an associated noise predictive calibration circuit (not shown) is disabled. Otherwise, comparator circuit 335 asserts enable signal 337 enabling operation of the associated noise predictive calibration circuit.

Figure 4:
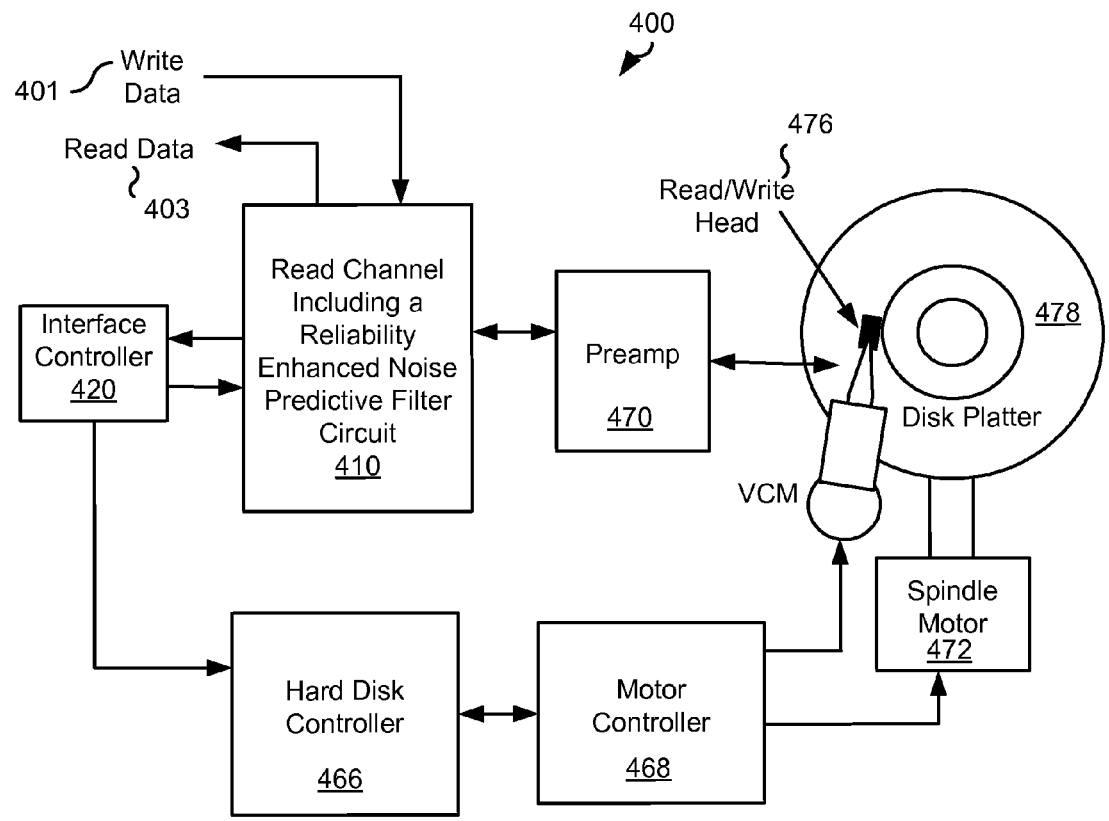
FIG. 4 shows a storage system including a read channel with a reliability enhanced noise predictive filter circuit in accordance with various embodiments of the present invention.

Turning to FIG. 4, a storage system 400 including a read channel 410 with a reliability enhanced noise predictive filter circuit in accordance with various embodiments of the present invention. Storage system 400 may be, for example, a hard disk drive. Storage system 400 also includes a preamplifier 470, an interface controller 420, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with either a longitudinal or a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 476 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel 410 via preamplifier 470. Preamplifier 470 is operable to amplify the minute analog signals accessed from disk platter 478. In turn, read channel circuit 410 decodes and digitizes the received analog signal to recreate the information originally written to disk platter 478. This data is provided as read data 403 to a receiving circuit. As part of processing the received information, read channel circuit 410 utilizes the reliability enhanced noise predictive filter circuit. Such a reliability enhanced noise predictive filter circuit may be implemented similar to, but are not limited to, any of those described below in relation to FIGS. 2-3, and/or may operate similar to, but is not limited to, the method discussed below in relation to FIG. 6. A write operation is substantially the opposite of the preceding read operation with write data 401 being provided to read channel circuit 410. This data is then encoded and written to disk platter 478.

It should be noted that storage system 400 may be integrated into a larger storage system such as, for example, a RAID (redundant array of inexpensive disks or redundant array of independent disks) based storage system. It should also be noted that various functions or blocks of storage system 400 may be implemented in either software or firmware, while other functions or blocks are implemented in hardware.

Figure 5:
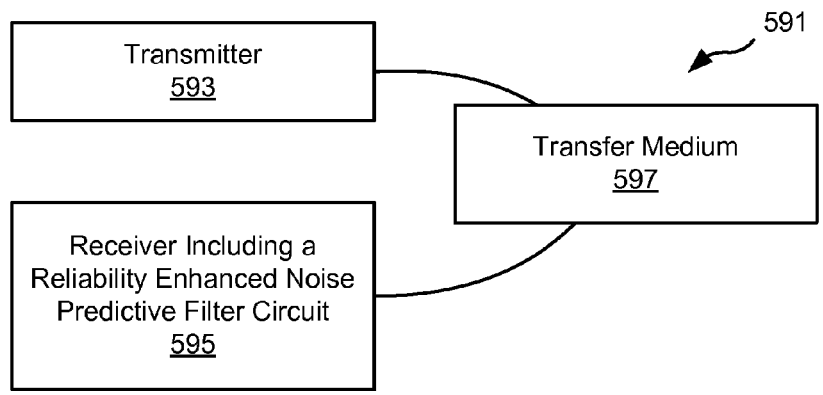
FIG. 5 shows a data transmission system including a receiver with a reliability enhanced noise predictive filter circuit in accordance with one or more embodiments of the present invention.

Turning to FIG. 5, a data transmission system 500 including a receiver 595 including a reliability enhanced noise predictive filter circuit in accordance with various embodiments of the present invention. Data transmission system 500 includes a transmitter 593 that is operable to transmit encoded information via a transfer medium 597 as is known in the art. The encoded data is received from transfer medium 597 by receiver 595. Receiver 595 incorporates a reliability enhanced noise predictive filter circuit. Such a reliability enhanced noise predictive filter circuit may be implemented similar to any of those described below in relation to FIGS. 2-3, and/or may operate similar to the method discussed below in relation to FIG. 6.

Figure 6:
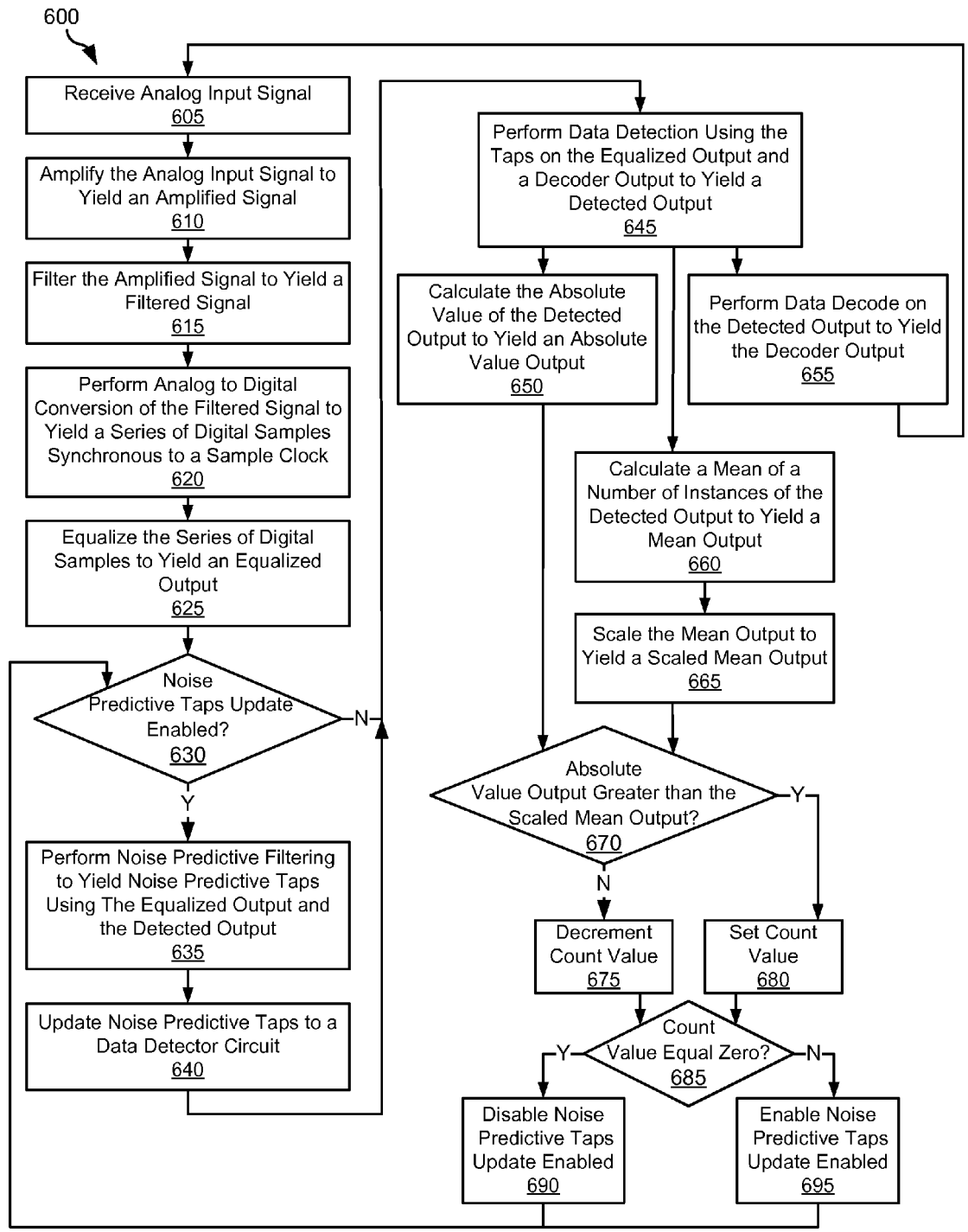
FIG. 6 is a flow diagram showing a method in accordance with some embodiments of the present invention for reliability enhanced noise predictive filtering.

Turning to FIG. 6, a flow diagram 600 shows a method in accordance with some embodiments of the present invention for reliability enhanced noise predictive filtering. Following flow diagram 600, an analog input signal is received (block 605). Analog input signal includes various information including synchronization information, user data, servo data and the like that is derived from a medium. The medium may be, but is not limited to, a magnetic storage medium or a wireless transmission medium. The analog input signal may be received, for example, from a read/write head assembly that senses information from a storage medium or from a receiver that receives information from some other type of medium. Based upon the disclosure provided herein, one of ordinary skill in the art will recognize a variety of sources of the analog input signal. The analog input signal is amplified to yield an amplified signal (block 610), and the amplified signal is filtered to yield a filtered signal (block 615). The aforementioned amplification and filtering may be done in either order, and may be done by an analog front end circuit as are known in the art. An analog to digital conversion process is applied to the filtered output to yield a series of corresponding digital samples (block 620). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention. The series of digital samples are equalized to yield an equalized output (block 625). In some embodiments of the present invention, the equalization process is done using a digital finite impulse response filter circuit as are known in the art. Based upon the disclosure provided herein, one of ordinary skill in the art will recognize a variety of equalizer circuits and/or equalization processes that may be used in relation to different embodiments of the present invention.

It is determined whether an update of noise predictive taps is enabled (block 630). As described below, an update of the noise predictive taps is enabled when the output of a data detection process indicates that the detected output is reliable. Otherwise an update of the noise predictive taps is disabled. Where an update is enabled (block 630), noise predictive filtering is applied to the equalized output and the detected output to yield noise predictive taps (block 635). Performing noise predictive filtering may be done using any noise predictive filter known in the art. The calculated noise predictive taps are updated to a data detector circuit (block 640).

A data detection process is applied to the equalized data using a decoder output and the noise predictive taps to yield a detected output (block 645). In some embodiments of the present invention, the data detection process is a Viterbi algorithm detection process. In other embodiments of the present invention, the data detection process is a maximum a posteriori algorithm detection process. A decoder process is applied to the detected output to yield a decoder output (block 655). The processes of blocks 605-655 are repeated for the continuing analog input.

In addition, an absolute value of the detected output is calculated to yield an absolute value output (block 650). Further, a mean of a number of instances of the detected output is calculated to yield a mean output (bock 660), and the mean output is scaled to yield a scaled mean output (block 665). In some embodiments the scaling is user selectable to be scaling by a value of ½, ¼, ⅛ or 1/16. Based upon the disclosure provided herein, one of ordinary skill in the art will recognize a variety of scaling factors that may be used in relation to different embodiments of the present invention.

It is determined whether the absolute value is greater than the scaled mean output (block 670). Where the absolute value output is greater than the scaled mean output indicating a reasonably reliable instance of the detected output (block 670), a counter value is set (block 680). In one particular embodiment of the present invention, the counter value is set to four. Otherwise, where the absolute value output is not greater than the scaled mean output indicating an unreliable instance of the detected output (block 670), a counter value is decremented (block 680). It is then determined whether the count value is equal to zero (block 685). The count value is equal to zero whenever a defined number of unreliable instances of detected output are received in a row. Where the count value is greater than zero (block 685), updating of noise predictive taps to the data detection process is enabled (block 695). Otherwise, when the count value is equal to zero or less (block 685), updating of noise predictive taps to the data detection process is disabled (block 690).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing defect detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing circuit, the data processing circuit comprising:
    a data detector circuit operable to apply a data detection algorithm to a data input to yield a detected output based at least in part on control values;
    a calibration circuit operable to update the control values based at least in part on the data input, the detected output, and a calibration circuit enable; and
    an enable circuit operable to generate the calibration circuit enable based at least in part on the detected output.

2. The data processing circuit of claim 1, wherein the data detector circuit is selected from a group consisting of: a Viterbi algorithm detector circuit, and a maximum a posteriori algorithm detector circuit.

3. The data processing circuit of claim 1, wherein the calibration circuit enable is asserted to enable operation of the calibration circuit when the detected output indicates a reliable instance of the detected output.

4. The data processing circuit of claim 1, wherein the calibration circuit enable is asserted to disable operation of the calibration circuit when the detected output indicates an unreliable instance of data.

5. The data processing circuit of claim 1, wherein the calibration circuit enable is asserted to disable operation of the calibration circuit when a defined number of consecutive instances of the detected output indicate unreliable data.

6. The data processing circuit of claim 5, wherein the defined number is four.

7. The data processing circuit of claim 1, wherein the enable circuit is further operable to:
    calculate a mean of a number of instances of the detected output to yield a mean output;
    scale the mean output to yield a scaled mean output;
    determine that an absolute value of the current instance of the detected output is greater than the scaled mean output; and
    assert the calibration circuit enable to enable operation of the calibration circuit based on the determination that the absolute value of the current instance of the detected output is greater than the scaled mean output.

8. The data processing circuit of claim 1, wherein the enable circuit is further operable to:
    calculate a mean of a number of instances of the detected output to yield a mean output;
    scale the mean output to yield a scaled mean output;
    determine that an absolute value of a defined number of consecutive instances of the detected output are less than the scaled mean output; and
    assert the calibration circuit enable to disable operation of the calibration circuit based on the determination that the absolute value of a defined number of consecutive instances of the detected output are less than the scaled mean output.

9. The data processing circuit of claim 8, wherein the defined number is four.

10. The data processing circuit of claim 1, wherein the data processing circuit is implemented as an integrated circuit.

11. The data processing circuit of claim 1, wherein the data processing circuit is incorporated in a storage device.

12. A method for data processing, the method comprising:
   receiving a data input;
   performing a data detection on the data input to yield a detected output based at least in part on control values;
   filtering the data input using the detected output to yield the control values;
   determining that the detected output indicates reliable data bits; and
   enabling update of the control values based at least in part on the determination that the detected output indicates reliable data bits.

13. The method of claim 12, the method further comprising:
   determining that the detected output indicates unreliable data bits; and
   disabling update of the control values based at least in part on the determination that the detected output indicates unreliable data bits.

14. The method of claim 12, the method further comprising:
   determining that a defined number of consecutive instances of the detected output indicates unreliable data bits; and
   disabling update of the control values based at least in part on the determination that the defined number of consecutive instances of the detected output indicates unreliable data bits.

15. The method of claim 14, wherein the defined number is four.

16. The method of claim 12, wherein the data detection is selected from a group consisting of: a Viterbi algorithm data detection, and a maximum a posteriori data detection.

17. A storage system, the storage system comprising:
   a storage medium;
   a read/write head assembly operable to sense information from the storage medium and to provide a corresponding continuous signal;
   an analog front end circuit operable to process the continuous signal to yield an analog input;
   an analog to digital converter circuit operable to sample the analog input synchronous to a sampling clock to yield a set of digital samples;
   an equalizer circuit operable to equalize the set of digital samples and to provide a corresponding equalized output;
   a data detector circuit operable to apply a data detection algorithm to the equalized output to yield a detected output based at least in part on control values;
   a calibration circuit operable to update the control values based at least in part on the data input, the detected output, and a calibration circuit enable; and
   an enable circuit operable to generate the calibration circuit enable based at least in part on the detected output.

18. The storage system of claim 17, wherein the calibration circuit enable is asserted to enable operation of the calibration circuit when the detected output indicates a reliable instance of the detected output.

19. The storage system of claim 17, wherein the calibration circuit enable is asserted to disable operation of the calibration circuit when the detected output indicates an unreliable instance of data.

20. The storage system of claim 17, wherein the calibration circuit enable is asserted to disable operation of the calibration circuit when a defined number of consecutive instances of the detected output indicate unreliable data.

* * * * *